(12) United States Patent
Hicks et al.

(10) Patent No.: US 8,594,569 B2
(45) Date of Patent: Nov. 26, 2013

(54) SWITCHABLE WIRED-WIRELESS ELECTROMAGNETIC SIGNAL COMMUNICATION

(75) Inventors: Matthew R. Hicks, Marlborough, MA (US); John Joyce, Canton, MA (US)

(73) Assignee: Bose Corporation, Framingham, MA (US)

(*) Notice: Subject to any disclaimer, the term of this patent is extended or adjusted under 35 U.S.C. 154(b) by 791 days.

(21) Appl. No.: 12/727,658

(22) Filed: Mar. 19, 2010

(65) Prior Publication Data

US 2011/0230137 A1 Sep. 22, 2011

(51) Int. Cl.
*H04B 7/00* (2006.01)

(52) U.S. Cl.
USPC .......................... 455/41.2; 455/41.3; 455/66.1

(58) Field of Classification Search
USPC .............. 455/41.2, 41.3, 90.3, 90.1, 66.1, 74, 455/74.1, 73
See application file for complete search history.

(56) References Cited

U.S. PATENT DOCUMENTS

| | | | |
|---|---|---|---|
| 6,185,205 B1* | 2/2001 | Sharrit et al. | 370/389 |
| 6,608,907 B1* | 8/2003 | Lee | 381/311 |
| 6,928,175 B1* | 8/2005 | Bader et al. | 381/123 |
| 7,916,877 B2* | 3/2011 | Goldberg et al. | 381/123 |
| 2002/0022456 A1* | 2/2002 | Izumi | 455/74.1 |
| 2003/0142631 A1 | 7/2003 | Silvester | |
| 2003/0184515 A1* | 10/2003 | Tsai | 345/156 |
| 2004/0196985 A1* | 10/2004 | Kokubo | 381/79 |
| 2005/0096086 A1* | 5/2005 | Singamsetty | 455/557 |
| 2005/0249357 A1 | 11/2005 | Schedivy | |
| 2007/0249286 A1* | 10/2007 | Ma et al. | 455/41.3 |
| 2008/0075432 A1* | 3/2008 | Cilluffo | 386/96 |
| 2008/0247554 A1* | 10/2008 | Caffrey | 381/18 |
| 2009/0247082 A1 | 10/2009 | Sathath et al. | |
| 2010/0020983 A1* | 1/2010 | Waites | 381/79 |
| 2010/0157817 A1* | 6/2010 | Mergler et al. | 370/252 |

FOREIGN PATENT DOCUMENTS

| | | |
|---|---|---|
| EP | 1182791 A2 | 2/2002 |
| WO | 2006075294 A2 | 7/2006 |

OTHER PUBLICATIONS

International Search Report and Written Opinion dated Jun. 20, 2011 for Int. Appln. No. PCT/US2011/027863.

* cited by examiner

*Primary Examiner* — Lewis West
(74) *Attorney, Agent, or Firm* — Bose Corporation

(57) ABSTRACT

An apparatus include a first electronic component having first interface circuitry configured to generate an electromagnetic signal. The first electronic component is switchable such that in a first mode of operation, the first interface circuitry is configured to transmit the generated electromagnetic signal via a first antenna, and in a second mode of operation, the first interface circuitry is configured to transmit the electromagnetic signal to a second electronic component via a constrained signal path coupling the first electronic component and the second electronic component. The generated electromagnetic signal may be a radio frequency signal or an optical signal.

25 Claims, 4 Drawing Sheets

SWITCHABLE WIRED-WIRELESS ELECTROMAGNETIC SIGNAL COMMUNICATION

BACKGROUND

This description relates to electromagnetic signal communication that is switchable between wired and wireless modes.

Electromagnetic (e.g., wireless radio frequency and optical) signal communication is used in a multitude of systems, including in audio systems in which audio signals are passed to speakers over wireless communication links. Use of such wireless links can eliminate the need to run cables between components, which can be cumbersome. Various communication protocols can be used for passing audio signals between components in a wireless audio system. For instance, digitized audio signals can be passed in isochronous or packet-based modes. Standard protocols such as Bluetooth™ and WiFi™ (IEEE 802.11), as well as various proprietary protocols, have been used for audio communication. Special-purpose electronic devices have also been developed, such as Texas Instruments device CC8520, which provides CD-quality uncompressed audio communication in the 2.4 GHz unlicensed frequency band.

Electromagnetic interference or other adverse environments may limit the effectiveness of electromagnetic signal communication. For example, other equipment operating in the 2.4 GHz band, such as WiFi, cordless telephones, and microwave ovens, can interfere with wireless audio communication. One way for a user to mitigate such interference is to move the endpoints of the radio link, for example, to increase the distance between an endpoint and a source of interference.

SUMMARY

In general, in one aspect, the invention features an apparatus that includes a first electronic component having first radio interface circuitry configured to generate a radio frequency signal. The first electronic component is switchable such that in a first mode of operation, the first radio interface circuitry is configured to transmit the generated radio frequency signal (e.g., to a second electronic component) via a first antenna, and in a second mode of operation, the first radio interface circuitry is configured to transmit the radio frequency signal to a second electronic component via a constrained radio frequency signal path coupling the first electronic component and the second electronic component.

Implementations of the invention may include one or more of the following features.

The second electronic component may include second radio interface circuitry configured to receive the radio frequency signal. The second electronic component may be switchable such that in the first mode of operation, the second radio interface circuitry is configured to receive the generated radio frequency signal via a second antenna, and in a second mode of operation, the second radio interface circuitry is configured to receive the radio frequency signal from the first electronic component via the constrained radio frequency signal path coupling the first electronic component and the second electronic component.

The apparatus may further include a cable coupling the first electronic component and the second electronic component forming the constrained radio frequency signal path.

The first electronic component and the second electronic component may include authentication circuitry configured to inhibit entering the second mode of operation in the absence of an authentication signal passing between the first and the second electronic components.

Each of the first radio interface circuitry and the second radio interface circuitry may be configured to both transmit and receive radio frequency signals.

The first radio interface circuitry may include an interface for accepting a signal encoding audio band signals and encoding said audio band signals in the generated radio frequency signal for communication of the audio band signals to the second electronic component.

The first radio interface circuitry may include attenuation circuitry for attenuating the generated radio frequency signal prior to communication of the audio band signals to the second electronic component.

The apparatus may further include at least one additional electronic component having radio interface circuitry configured to receive the radio frequency signal from the first electronic component via the constrained radio frequency signal path.

The second electronic component may be configured to retransmit the radio frequency signal received from the first electronic component to at least one additional electronic component.

The first antenna may be switchably coupled to the first radio interface circuitry.

The first radio interface circuitry includes power control circuitry.

The first electronic component may further include a first connection element configured to accept a cable for forming the constrained radio frequency signal path; a first switch element coupled between the first connection element and the first radio interface circuitry for passing radio frequency signals between the first radio interface circuitry and the first connection element in the second mode of operation; and authentication circuitry coupled to the first connection element and the first switch element, the authentication circuitry configured to control the first switch element to pass the radio frequency signals only if a determined authentication signal is passed between the authentication circuitry and the second electronic component via the first connection element.

The first switch element may also be coupled between the first antenna and the radio interface circuitry for passing radio frequency signals between the first radio interface circuitry and the first antenna in at least the first mode of operation.

The authentication signal may include a signal substantially outside the frequency spectrum of the radio frequency signal.

The authentication signal may include a substantially constant signal, a voltage encoded signal, or a current encoded signal.

The first electronic component may include a sound bar and the second electronic component may include one of the following: a bassbox, a speaker, and a pair of headphones.

In general, in another aspect, the invention features a method that includes generating, by first radio interface circuitry in a first electronic component, a radio frequency signal for transmission to a second electronic component; determining, by the first electronic component, whether the first electronic component is coupled to the second electronic component by a constrained radio frequency signal path; and based at least in part on results of the determining, taking an action that includes at least one of the following: transmitting the radio frequency signal to the second electronic component via the constrained radio frequency signal path; and transmitting the radio frequency signal to the second electronic component via a wireless radio frequency signal path.

Implementations of the invention may include one or more of the following features.

The method of determining whether the first electronic component is coupled to the second electronic component by the constrained radio frequency signal path may include detecting the presence of an authentication signal passing between the first and the second electronic components.

In general, in another aspect, the invention features a system having a sound bar including first radio interface circuitry configured to generate a radio frequency signal. The sound bar is switchable such that in a first mode of operation, the first radio interface circuitry is configured to transmit the generated radio frequency signal via a first antenna, and in a second mode of operation, the first radio interface circuitry is configured to transmit the radio frequency signal to a bassbox via a constrained radio frequency signal path coupling the sound bar and the bassbox.

Implementations of the invention may include one or more of the following features.

The bassbox may include second radio interface circuitry configured to receive the radio frequency signal. The bassbox may be switchable such that in the first mode of operation, the second radio interface circuitry is configured to receive the generated radio frequency signal via a second antenna, and in a second mode of operation, the second radio interface circuitry is configured to receive the radio frequency signal from the sound bar via the constrained radio frequency signal path coupling the sound bar and the bassbox.

In general, in another aspect, the invention features an apparatus having a first electronic component comprising first radio interface circuitry configured to receive a radio frequency signal. The first electronic component is switchable such that in a first mode of operation, the first radio interface circuitry is configured to receive the radio frequency signal via a first antenna, and in a second mode of operation, the first radio interface circuitry is configured to receive the radio frequency signal from a second electronic component via a constrained radio frequency signal path coupling the first electronic component and the second electronic component.

Implementations of the invention may include one or more of the following features.

The second electronic component may include second radio interface circuitry configured to generate the radio frequency signal. The second electronic component may be switchable such that in the first mode of operation, the second radio interface circuitry is configured to transmit the radio frequency signal via a second antenna, and in a second mode of operation, the second radio interface circuitry is configured to transmit the radio frequency signal to the first electronic component via the constrained radio frequency signal path coupling the first electronic component and the second electronic component.

In general, in another aspect, the invention features an apparatus having a first electronic component comprising first interface circuitry configured to generate an electromagnetic signal. The first electronic component is switchable such that in a first mode of operation, the first interface circuitry is configured to transmit the generated electromagnetic signal via a first antenna, and in a second mode of operation, the first interface circuitry is configured to transmit the electromagnetic signal to a second electronic component via a constrained signal path coupling the first electronic component and the second electronic component.

Implementations of the invention may include one or more of the following features.

The generated electromagnetic signal may include one of an optical signal and a radio frequency signal.

Other general aspects include other combinations of the aspects and features described above and other aspects and features expressed as methods, apparatus, systems, computer program products, and in other ways.

The systems and methods described herein have a number of advantages. Using the same electronics for both wired and wireless communication between two components of a system reduces the cost and complexity of the system by eliminating the need for different access electronics for each mode. Additionally, requiring one-way or mutual authentication between components of a system can avoid mismatches between equipment, thus preventing damage to electronic circuits in the components.

Other features and advantages of the invention are apparent from the following description, and from the claims.

DESCRIPTION

Figure 1:
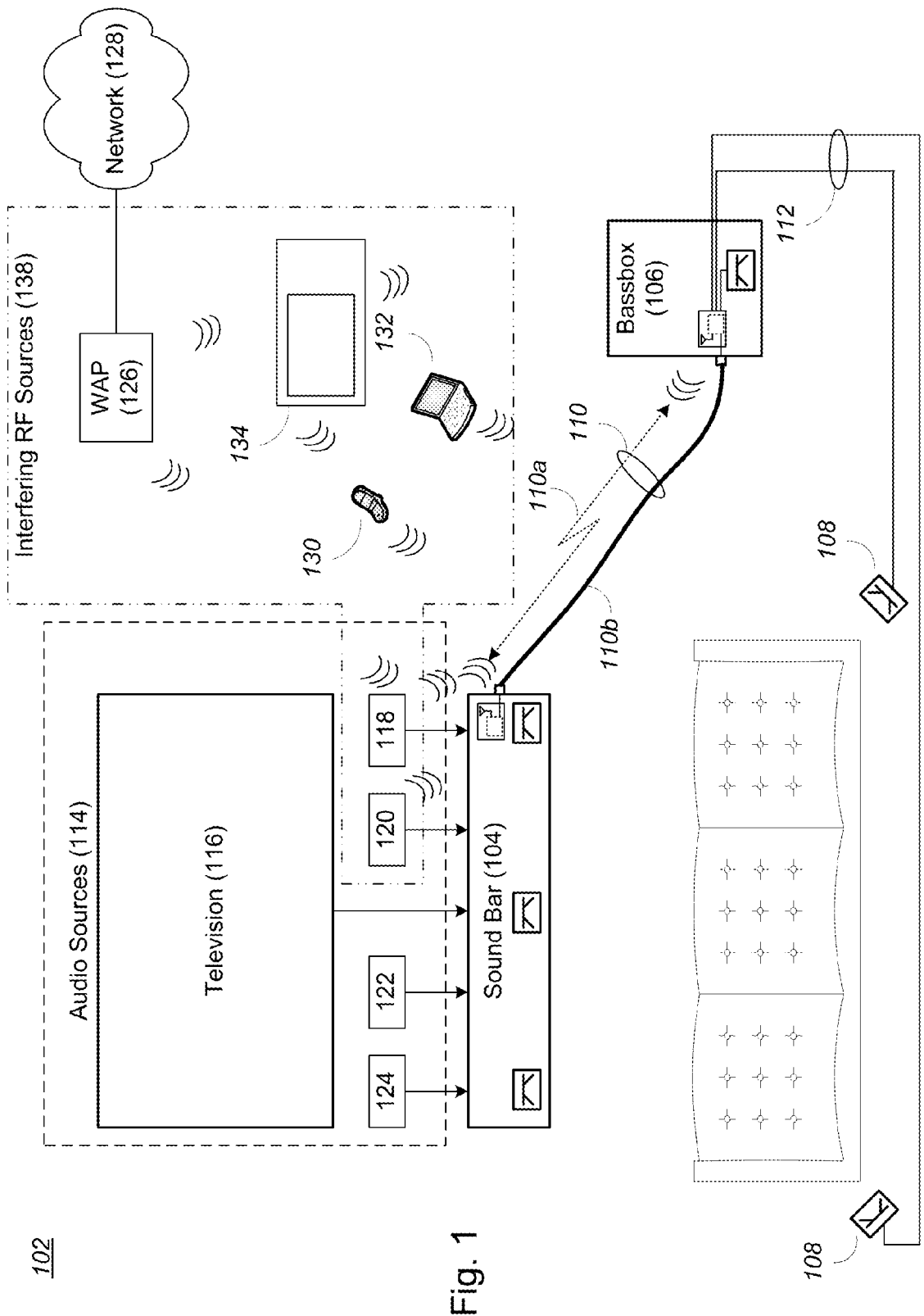
FIG. 1 shows a home entertainment system located in a room with interfering RF sources.

Referring to FIG. 1, an exemplary home entertainment system located in a room 102, such as a living room, has a multi-channel speaker setup that includes a sound bar 104, a bassbox 106, and two rear surround speakers 108. The sound bar 104 combines a receiver or pre-amp/amplifier combination and an array of speakers in an enclosure that can be mounted on a wall or placed near a television 116. The sound bar 104 and the bassbox 106 are coupled by bi-directional communication links 110 over which audio data and other data, such as control data and software updates, are passed; each rear speaker 108 is connected to the bassbox 106 via communication links 112.

In the depicted example of FIG. 1, the sound bar 104 has analog and digital (e.g., optical) audio inputs (not shown) to connect audio sources 114 of the home entertainment system, such as the television 116, an internet-enabled streaming video player 118, an internet-enabled video game console 120, a satellite receiver box 122, and a DVD player 124. In some implementations, the sound bar 104 integrates a Blu-ray player, a radio tuner, or an iPod™ dock. Other electronic devices may be present in or near the room 102, such as a wireless access point (WAP) 126 coupled to a network 128 (e.g., a Local Area Network (LAN) or the Internet), a cordless telephone 130, a laptop computer 132, and a microwave oven 134.

Figure 2:
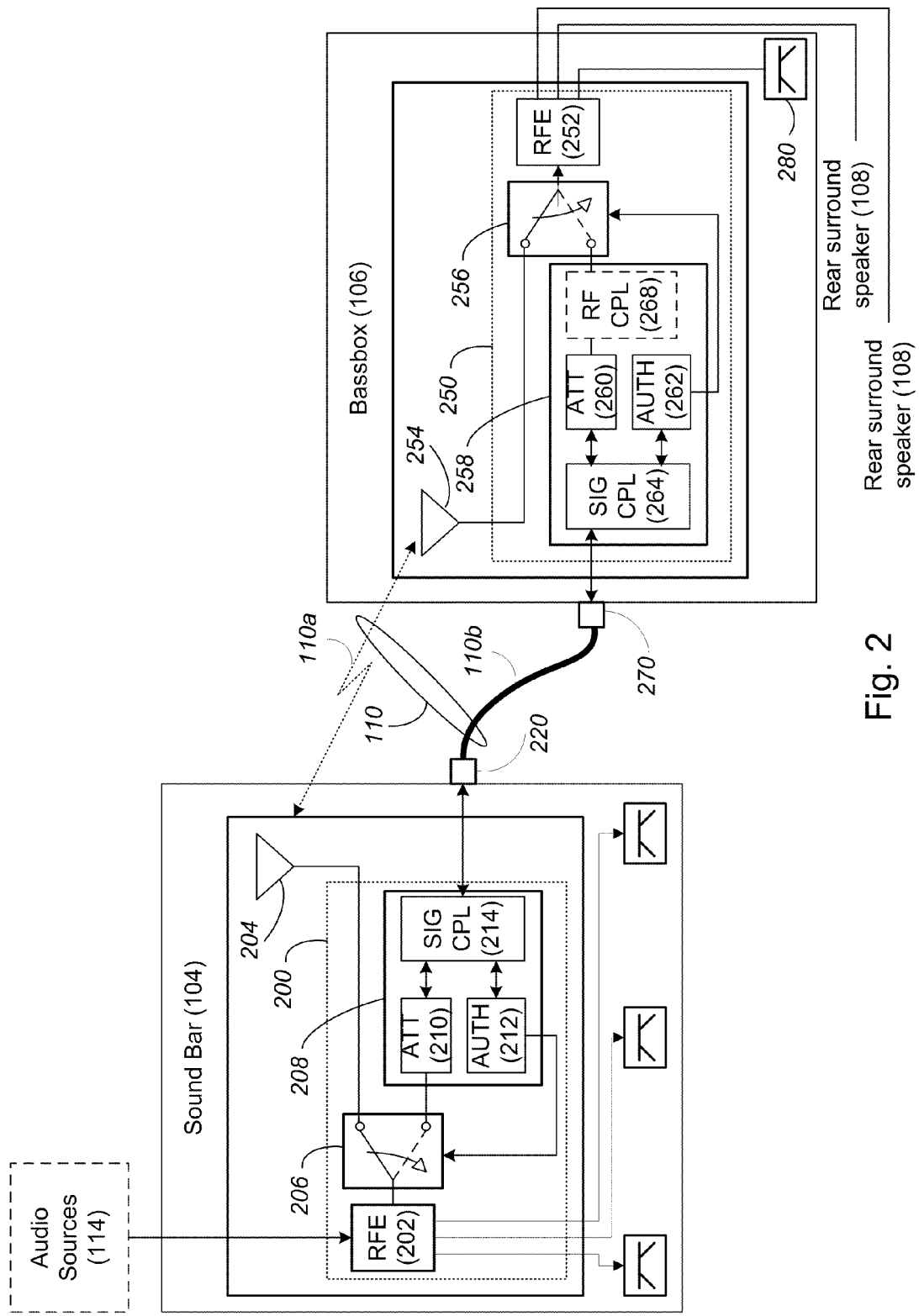
FIG. 2 shows block diagrams of one implementation of a sound bar and a bassbox of a multi-channel speaker setup of the home entertainment system of FIG. 1.

FIG. 2 shows one example of the sound bar 104 and the bassbox 106, each including a radio frequency interface 200 or 250 implemented with a single chip integrated circuit device (referred to as RF electronics or simply "RFE") that includes a built-in wireless audio transmission protocol. Referring also to FIG. 1, the RFE 202 in the sound bar 104 is operable to convert audio signals received from an audio source 114 (e.g., internet-enabled streaming video player 118 or satellite receiver box 122) into digital audio data suitable for transmission over a wireless communication link 110a via an internal antenna 204; the RFE 252 in the bassbox 106 is operable to convert digital audio data received over the wireless communication link 110a via an internal antenna 254 into analog audio signals suitable for output by the rear surround speakers 108 and a bassbox speaker 280 (to augment the bass capabilities of the sound bar 104). Other data, such as control data or software updates, are transmitted in a similar manner. A commercial example of RFE 202, 252 is the 2.4 GHz "CC8520" system-on-chip available from Texas Instruments of Dallas, Tex.

Referring again to FIG. 1, over-the-air data communications via the wireless communication link 110a between the sound bar 104 and the bassbox 106 may experience interference that inhibits proper (or optimal) operation of the system. The interference may include signals in the range of 2.4 GHz emitted by interfering radio frequency (RF) sources (referred to collectively in this description as "interfering RF sources 138) in the vicinity of the sound bar 104 or the bassbox 106, such as the internet-enabled streaming video player 118, the internet-enabled video game console 120, the WAP 126, the cordless telephone 130, the laptop computer 132, and the microwave oven 134. Interference may also result from signal propagation characteristics among the components of home entertainment system. Similarly, the over-the-air data communications between the sound bar 104 and the bassbox 106 may interfere with the operation of the other devices (e.g., the internet-enabled streaming video player 118, the internet-enabled video game console 120, the WAP 126, the cordless telephone 130, the laptop computer 132, and the microwave oven 134). In either case, a user may wish to mitigate the interference among devices in order to improve the audio performance of the home entertainment system. Conventional mitigation approaches, such as moving the components of the home entertainment system or moving the source(s) of interference may be insufficient to regain satisfactory (or optimal) operation of the system, or may be impractical or inconvenient due to the layout of the room 102. In some instances, a user may wish to avoid RF communication or emission of RF signals altogether for other reasons.

One approach to mitigating RF interference or avoiding RF communication/signal emission is to provide a communication path between the sound bar 104 and the bassbox 106 via a wired communication link 110b (e.g., a twisted pair cable or coaxial conductor). In one approach such a communication path (referred to as "wired communication path") may be implemented using electronics (referred to as "non-RF electronics") that functionally operate in parallel with the RFE 202, 252. The non-RF electronics may include corresponding modulation-demodulation (modem) components tailored for a 'wired' connection between the sound bar 104 and the bassbox 106. In order to provide at least two channels of CD-quality audio without compression, the data rate through the wired communication link preferably exceeds 1.5 Mb/s. Providing separate non-RF electronics suitable for such data rate communications may be undesirable, for instance, because of the added cost of the additional electronics.

One alternate approach for providing a wired communication path between the sound bar 104 and the bassbox 106 is shown in FIG. 2. In the depicted example, RF electronics "RFEs 202, 252" may be selectively coupled via a wireless communication link 110a or a wired communication link 110b. The sound bar 104 is implemented with a switch 206 that controls the connection of RFE 202 to internal antenna 204 (providing a wireless communication path) or wired connection elements 208 (providing a wired communication path). Wired connection elements 208 include attenuation circuitry "ATT 210" and authentication circuitry "AUTH 212". Similarly, a switch 256 in the bassbox 106 controls the connection of RFE 252 to internal antenna 254 or wired connection elements 258, which include attenuation circuitry "ATT 260" and authentication circuitry "AUTH 262". In some examples (including the examples described with reference to FIGS. 1, 2, and 3), the switches 206, 256 have a default position that enables the wireless communication path between the sound bar 104 and the bassbox 106. A physical cable, such as a coaxial cable or a twisted pair cable, is coupled to external connectors 220 and 270 to provide the end-to-end wired communication path when enabled.

When data is transmitted via the wireless communication link 110a, the antennas 204, 254 present a certain impedance (e.g., 50 Ohm load) to the RFEs 202, 252. To enable proper operation of and/or avoid damaging the RFEs 202, 252 during the transmission of data via the wired communication link 110b, the sound bar 104 and the bassbox 106 can be implemented such that the wired path presents the same or similar impedance and path loss to each RFE 202, 252 such that the received signal levels are the same or similar that would have been received over an antenna. The attenuation circuitry ATT 210, 260 are selected to provide an appropriate level of impedance and path loss to the RFE 202, 252 when used in conjunction with a physical cable. In one example, when operating over the air, the signal received at the receiving RFE is far lower in magnitude (e.g., −55 dBm) than the signal provided by the transmitting RFE (e.g., 10 dBm). That is, the wireless communication link 110a provides about 65 dB of attenuation. To avoid damage to the RFEs 202, 252, or a reduction in reception quality, the combination of the physical cable, external connectors 220, 270, and attenuation circuitries ATT 210, 260 preferably present about the same level of attenuation as that presented by the wireless communication link 110a. For instance, for a 15 foot coaxial cable with a loss of approximately 3 dB per foot at 2.4 GHz, the total loss over the 15 foot length of coaxial cable is 45 dB. Thus, for a multi-channel speaker setup with that 15 foot coaxial cable connecting the sound bar 104 and the bassbox 106, the attenuation circuitries ATT 210, 260 are selected to provide about 10 dB of attenuation. In some examples, the cable has a 50 Ohm impedance, and the attenuation circuitry ATT 210, 260 is configured to maintain that impedance. In other examples, the physical cable has different impedance and/or attenuation characteristics (due, for instance, to a different dielectric constant in the insulation of a coaxial cable or use of a different twist ratio twisted pair cable) or a different length, and the attenuation circuitries 210, 260 are selected accordingly. Because the wireless communication link 110a is inherently lossy, it is not necessary to implement the wired communication link 110b using a high-quality cable. Rather, a lower quality cable that simulates the loss experienced in over-the-air transmission is preferred.

The components of the sound bar 104 and/or the bassbox 106 may malfunction or be damaged if a user attaches a cable with a substantially different impedance or attenuation characteristics (e.g., a different type of cable or a cable of a substantially different length) than accounted for by system designers of the sound box 104 and the bassbox 106. To avoid this danger, the sound bar 104 and the bassbox 106 may be implemented with non-standard external connectors 220, 270 that are designed to accept a specific type of cable. Such a cable may be provided "in-the-box" with a commercial sale of the exemplary multi-channel speaker setup of FIGS. 1 and 2. Furthermore, by incorporating non-standard external connectors into the design of the sound bar 104 and the bassbox 106, it becomes difficult (if not impossible) for a user to attach an external antenna to the sound bar 104 or the bassbox 106 via the external connectors 220, 270. This has the added benefit of placing the sound bar 104 and the bassbox 106 in compliance with a Federal Communications Commission (FCC) regulation (FCC Part 15.203), which stipulates amongst other things that an intentional radiator "shall be designed to ensure that no antenna other than that furnished by the responsible party shall be used with the device."

In some examples, the switches 206, 256 are manual switches such as SPDT (Single Pole, Double Throw) switches operable by a user. For instance, when a user is bothered by interference on the wireless communication link 110a, the user may toggle the switch to enable the wired communication path. In other examples, the switches 206, 256 are automatically toggled upon detection of a wired connection between the sound bar 104 and the bassbox 106. In some cases, the wired communication path is only enabled if mechanical switches within the sound bar 104 and the bassbox 106 detect that a physical cable is connected to both of the external connectors 220, 270. If one or both ends of the cable are unplugged, the wireless connection path is enabled.

Various detection approaches may be used to detect the wired connection. These approaches may also provide differing degrees of one-way or mutual authentication of the sound bar 104 and the bassbox 106, reducing the risk of mismatch between the components. Authentication may also provide information useful for the configuration of RFE 202, 252 or attenuation circuitries ATT 210, 260, such as a range of expected voltage or current signals. Furthermore, appropriate authentication schemes may enable the sound bar 104 and the bassbox 106 to be placed in compliance of a FCC regulation (FCC Part 15.203), which requires an intentional radiator to be operated only with an antenna with which it is authorized to operate. In some examples, the multi-channel speaker setup employs an authentication scheme and uses standard external connectors 220, 270. In other examples, an authentication scheme and non-standard external connectors 220, 270 are used together to bring further security to the multi-channel speaker setup.

One approach to detection and/or authentication of the sound bar 104 and the bassbox 106 involves the transmission of a low frequency authentication signal (e.g., a constant 2.5 V DC voltage) over the wired communication link 110b. The low frequency authentication signal may be transmitted only in one direction (e.g., from the sound bar 104 to the bassbox 106) for one-way detection and/or authentication, or may be transmitted in both directions for mutual detection and/or authentication. In some examples, a source of the signal may authenticate the presence of the other component by sensing a characteristic of the load (e.g. the target load is in an expected range of values) on the signal, thereby enabling mutual authentication. In another approach, a symbol stream may be transmitted in a low frequency band, e.g., using an RS-232 protocol or a coded pulse train at 9600 bits per second in a frequency band below 10 kHz. In this approach, a component is authenticated only if the content of the received symbol stream matches the expected content. One-way or mutual authentication may be enabled in this approach as well, e.g., by time or frequency multiplexing transmissions in each direction.

Figure 3:
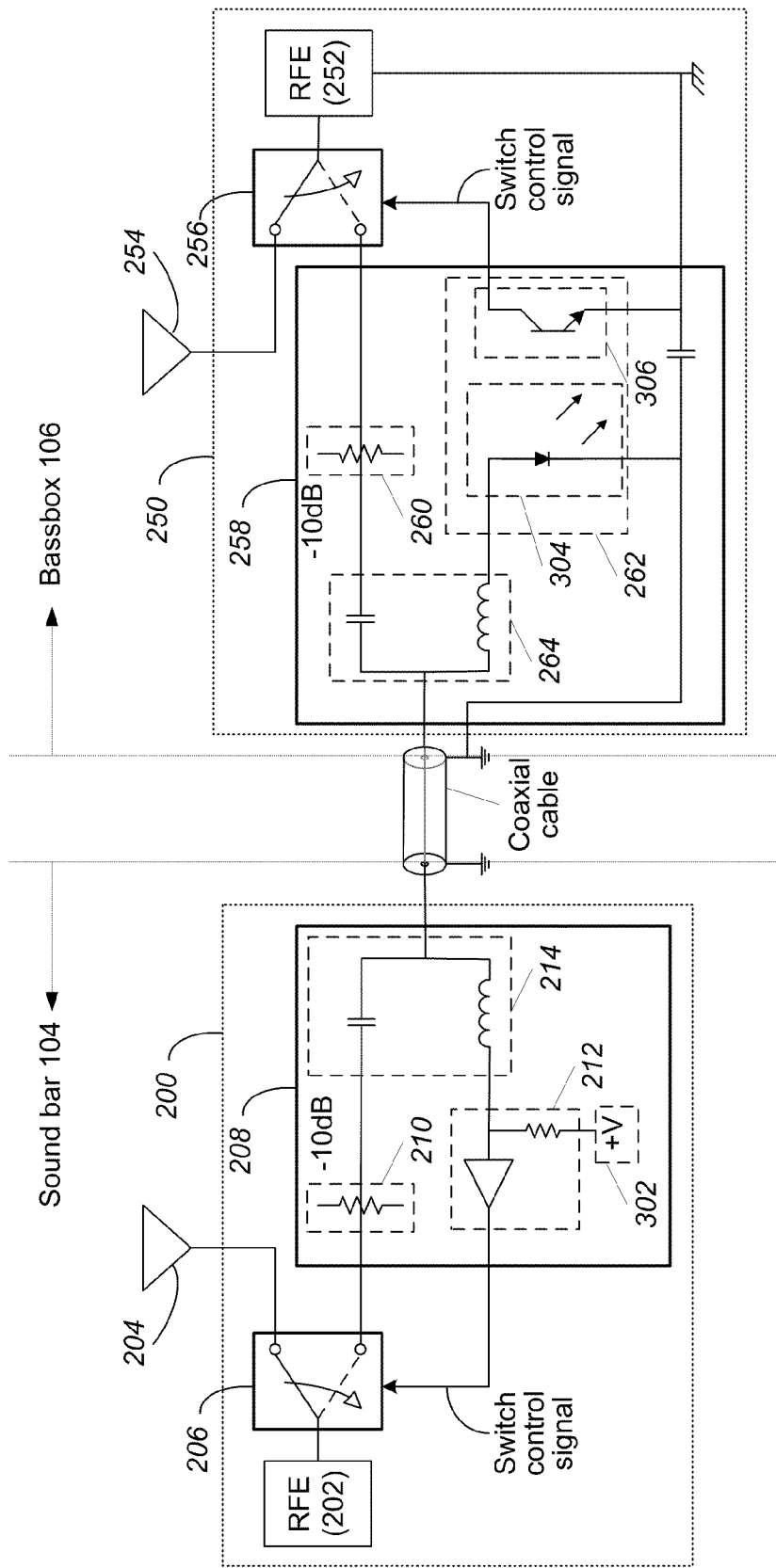
FIG. 3 shows circuit diagrams of one implementation of the sound bar and the bassbox of FIG. 2.

FIG. 3 shows one implementation of the wired connection elements 208, 258. The authentication circuitry 262 of the bassbox's wired connection element 258 is implemented as an optocoupler, consisting of a light emitting diode (LED) 304 that is selected (e.g., by system designers of the sound bar 104 and the bassbox 106) to emit light and activate a phototransistor 306, only if the current flow through the LED 304 falls within a predetermined range of values.

The current flow through the LED 304 causes a circuit to be formed with a source of the low frequency authentication signal (e.g., voltage source 302 of the sound bar 104), and a switch control signal to be generated. The switch control signal toggles the switch 206 of the sound bar 104 from its default position (i.e., connecting the RFE 202 with the internal antenna 204) to an alternate position that enables the wired communication path, thereby allowing an RF signal outputted by the RFE 202 to be passed to attenuation circuitry 210. The attenuation circuitry 210 reduces the amplitude of the RF signal by a predefined amount (e.g., −10 dB) prior to being passed to signal coupling circuitry SIG CPL 214. The signal coupling circuitry SIG CPL 214 combines the attenuated RF signal with the low frequency authentication signal and transmits the combined signal through the coaxial cable to the wired connection element 258 of the bassbox 106.

The combined signal received by the wired connection element 258 is passed through signal decoupling circuitry SIG CPL 264 of the bassbox 106, which recovers the low frequency authentication signal and the attenuated RF signal. As before, if the current flow associated with the low frequency signal falls within the predetermined acceptable range of values, the LED 304 of the authentication circuitry 262 emits light. The phototransistor 306 of the authentication circuitry 262 detects the light emitted by LED 304 and operates the switch 256 of the bassbox 106 to enable a wired communication path between the sound bar 104 and the bassbox 106. The attenuated RF signal that is recovered by the signal decoupling circuitry SIG CPL 264 from the combined signal is passed to attenuation circuitry 260, where the amplitude of the RF signal is further reduced by a predefined amount (e.g., another −10 dB) prior to being passed to the RFE 252 of the bassbox 106 for further processing.

The sound bar 104 may be implemented with multiple internal antennas to mitigate reception problems, such as multi-path fading. In some cases, the antennas within the sound bar 104 are placed at some fractional multiple of a wavelength apart. The RFE 202 of the sound bar 104 dynamically switches between the internal antennas to select the internal antenna that has the best signal reception at a particular moment in time. In some examples, multiple internal antennas may be deployed within the bassbox 106 instead of, or in addition to, those deployed within the sound bar 104.

Referring again to FIG. 2, the bassbox 106 may be implemented with RF coupler circuitry RF CPL 268 electrically disposed between the switch 256 and the attenuation circuitry 260. The RF coupler circuitry enables the grounds of the sound bar 104 and the bassbox 106 to be isolated from one another. In some examples, the RF coupler circuitry RF CPL 268 is implemented using an RF transformer or back-to-back baluns. Isolation of the grounds may be significant to the performance of the components of the sound bar 104 and the bassbox 106, for example, if the components are plugged into different power sources which have different ground potentials, or if a coupling of the grounds could introduce a ground loop between the components.

Referring again to FIG. 2, in some examples, one or both of RFE 202, 252 are equipped with power control. Detection of the wired connection causes the sound bar 104, the bassbox 106, or both to reduce power. This power control can be used instead of or in combination with the attenuation circuitry 210, 260, assuming a sufficient range of power control is available.

In some examples, the sound bar 104 is configured to communicate directly with a set of headphones (rather than with bassbox 106) via a wireless communication link and a wired communication link. The components and circuitry in the headphones may be identical to or share characteristics with the components and circuitry as described above with respect to the bassbox 106.

Figure 4:
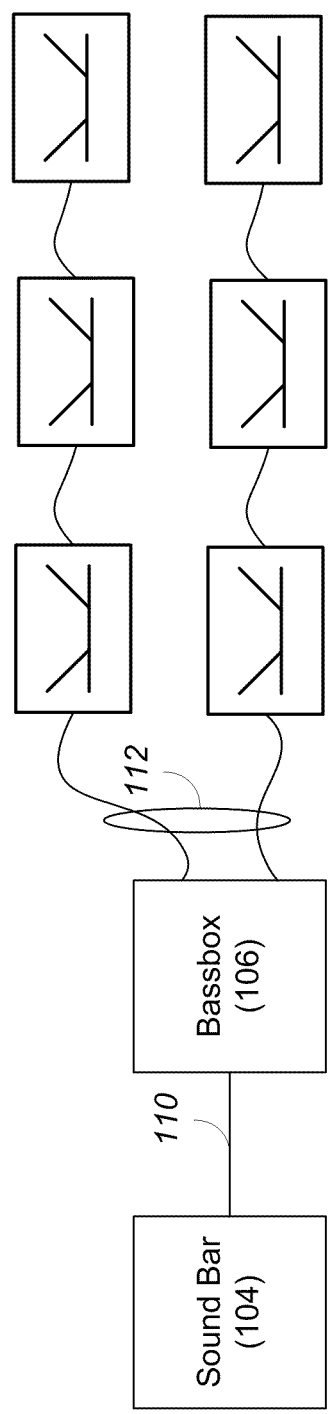
FIG. 4 shows block diagrams of another multi-channel speaker setup of a home entertainment system.

Although described in the context of a multi-channel speaker set up that includes a sound bar 104, a bassbox 106, and two rear speakers 108, the techniques described in this document are also applicable to any multi-channel speaker set up and/or audio component configuration. For example, one or two channels outputted by the bassbox 106 may be provided to headphones coupled to the bassbox 106 via wired or wireless connections. In the example depicted in FIG. 4, each of the two channels outputted by the bassbox 106 is provided to a group of speakers that are daisy-chained by wired and/or wireless communication links. The connection between the bassbox 106 and each group of speakers may be via wired and/or wireless communication links. In the latter case, the bassbox 106 may be further implemented with additional RF electronics and/or internal antennas to enable wireless communication paths to be established between the bassbox and respective ones of the speaker groups. Likewise, a speaker of the group may be implemented with RF electronics and an internal antenna to enable audio and/or control data received from a component (e.g., the bassbox 106 or another speaker of the group) to be rebroadcast to another component (e.g., yet another speaker of the group).

In some examples, radio frequency communication between the components is unidirectional, such that the sound bar 104 includes a transmitter and the bassbox 106 includes a receiver, but the bassbox 106 does not transmit radio frequency signals back to the sound bar 104.

In some examples, in the wireless mode, the sound bar 104 communicates with multiple other components, for example the bassbox 106 as well as multiple other satellite speakers (not shown). In the wired mode, one way to provide a constrained radio frequency path instead of the over-the-air path is to provide a common cable that couples three or more components and forms a common constrained broadcast domain to which each component is coupled. For example, a coaxial cable may be laid around a room and include multiple taps, each providing a bidirectional radio frequency path to one of the components. In another example of a common broadcast domain for three or more components, the components are daisy chained, with components in the chain coupling the RF signals between its connections.

In some examples, over-the-air RF communication between the sound bar 104 and the bassbox 106 is used in a first mode, and wired RF communication is used in a second mode. However, the over-the-air interface at the sound bar 104 or the bassbox 106 is also used for other communication, such as with a remote control unit or with wireless headphones. To accommodate the remote control or headphone communication, the sound bar 104 and/or the bassbox 106 may be implemented to enable simultaneous communication over the wired and wireless communication links. As an example, the switches 206, 256 may be replaced by splitters that enable RF transmission via both the internal antennas 204, 254 and the wired connection elements 208, 258. This parallel transmission of the audio data may result in loss at a level of, e.g., 3-4 dB. To compensate for such loss, RFE 202 may be implemented to increase the amplitude of the RF signal prior to transmission.

Although aspects of the invention have been described in the context of radio frequency signal communication that is switchable between wired and wireless modes, the techniques described above are also applicable for optical-based audio systems. For instance, a sound bar can be implemented with optical interface circuitry that is switchable between an emitter of an optical signal over an optical free space and a constrained optical signal path that couples the sound bar to an audio component (e.g., a bassbox or a speaker) that is configured to receive (and optionally, process) the optical signal.

It is to be understood that the foregoing description is intended to illustrate and not to limit the scope of the invention, which is defined by the scope of the appended claims. Other embodiments are within the scope of the following claims.

What is claimed is:

1. An apparatus comprising:
   a first electronic component comprising first radio interface circuitry configured to generate a radio frequency signal;
   wherein the first electronic component is switchable such that
      in a first mode of operation, the first radio interface circuitry is configured to transmit the generated radio frequency signal via a first antenna, and
      in a second mode of operation, the first radio interface circuitry is configured to transmit the radio frequency signal to a second electronic component via a constrained radio frequency signal path coupling the first electronic component and the second electronic component,
   wherein the first electronic component and the second electronic component include authentication circuitry configured to inhibit entering the second mode of operation in the absence of an authentication signal passing between the first and the second electronic components.

2. The apparatus of claim 1, further comprising:
   the second electronic component comprising second radio interface circuitry configured to receive the radio frequency signal;
   wherein the second electronic component is switchable such that in the first mode of operation, the second radio interface circuitry is configured to receive the generated radio frequency signal via a second antenna, and in a second mode of operation, the second radio interface circuitry is configured to receive the radio frequency signal from the first electronic component via the constrained radio frequency signal path coupling the first electronic component and the second electronic component.

3. The apparatus of claim 2, further comprising:
   a cable coupling the first electronic component and the second electronic component forming the constrained radio frequency signal path.

4. The apparatus of claim 2, wherein each of the first radio interface circuitry and the second radio interface circuitry is configured to both transmit and receive radio frequency signals.

5. The apparatus of claim 2, wherein the first radio interface circuitry includes an interface for accepting a signal encoding audio band signals and encoding said audio band signals in the generated radio frequency signal for communication of the audio band signals to the second electronic component.

6. The apparatus of claim 5, wherein the first radio interface circuitry includes attenuation circuitry for attenuating the generated radio frequency signal prior to communication of the audio band signals to the second electronic component.

7. The apparatus of claim 2, further comprising at least one additional electronic component including radio interface circuitry configured to receive the radio frequency signal from the first electronic component via the constrained radio frequency signal path.

8. The apparatus of claim 2, wherein the second electronic component is configured to retransmit the radio frequency signal received from the first electronic component to at least one additional electronic component.

9. The apparatus of claim 1, wherein the first electronic component further comprises the first antenna switchably coupled to the first radio interface circuitry.

10. The apparatus of claim 1, wherein the first radio interface circuitry include power control circuitry.

11. The apparatus of claim 1, wherein the first electronic component further comprises
a first connection element configured to accept a cable for forming the constrained radio frequency signal path;
a first switch element coupled between the first connection element and the first radio interface circuitry for passing radio frequency signals between the first radio interface circuitry and the first connection element in the second mode of operation; and
authentication circuitry coupled to the first connection element and the first switch element, the authentication circuitry configured to control the first switch element to pass the radio frequency signals only if a determined authentication signal is passed between the authentication circuitry and the second electronic component via the first connection element.

12. The apparatus of claim 11, wherein the first switch element is also coupled between the first antenna and the radio interface circuitry for passing radio frequency signals between the first radio interface circuitry and the first antenna in at least the first mode of operation.

13. The apparatus of claim 11, wherein the authentication signal comprises a signal substantially outside the frequency spectrum of the radio frequency signal.

14. The apparatus of claim 13, wherein the authentication signal comprises a substantially constant signal.

15. The apparatus of claim 13, wherein the authentication signal comprises a voltage encoded signal.

16. The apparatus of claim 13, wherein the authentication signal comprises a current encoded signal.

17. The apparatus of claim 2, wherein the first electronic component includes a sound bar and the second electronic component includes one of the following: a bassbox, a speaker, and a pair of headphones.

18. The apparatus of claim 1, wherein the first electronic component is switchable such that in the first mode of operation, the first radio interface circuitry is configured to transmit the generated radio frequency signal to the second electronic component via a first antenna.

19. A method comprising:
generating, by first radio interface circuitry in a first electronic component, a radio frequency signal for transmission to a second electronic component;
determining, by the first electronic component, whether the first electronic component is coupled to the second electronic component by a constrained radio frequency signal path; and
based at least in part on results of the determining, taking an action that includes at least one of the following:
transmitting the radio frequency signal to the second electronic component via the constrained radio frequency signal path; and
transmitting the radio frequency signal to the second electronic component via a wireless radio frequency signal path,
wherein determining whether the first electronic component is coupled to the second electronic component by the constrained radio frequency signal path comprises:
detecting the presence of an authentication signal passing between the first and the second electronic components.

20. A system comprising:
a sound bar including first radio interface circuitry configured to generate a radio frequency signal;
wherein the sound bar is switchable such that
in a first mode of operation, the first radio interface circuitry is configured to transmit the generated radio frequency signal via a first antenna, and
in a second mode of operation, the first radio interface circuitry is configured to transmit the radio frequency signal to a bassbox via a constrained radio frequency signal path coupling the sound bar and the bassbox,
wherein the sound bar and the bassbox include authentication circuitry configured to inhibit entering the second mode of operation in the absence of an authentication signal passing between the sound bar and the bassbox.

21. The system of claim 20, wherein the bassbox includes second radio interface circuitry configured to receive the radio frequency signal, and wherein the bassbox is switchable such that in the first mode of operation, the second radio interface circuitry is configured to receive the generated radio frequency signal via a second antenna, and in a second mode of operation, the second radio interface circuitry is configured to receive the radio frequency signal from the sound bar via the constrained radio frequency signal path coupling the sound bar and the bassbox.

22. An apparatus comprising:
a first electronic component comprising first radio interface circuitry configured to receive a radio frequency signal;
wherein the first electronic component is switchable such that
in a first mode of operation, the first radio interface circuitry is configured to receive the radio frequency signal via a first antenna, and
in a second mode of operation, the first radio interface circuitry is configured to receive the radio frequency signal from a second electronic component via a constrained radio frequency signal path coupling the first electronic component and the second electronic component,
wherein the first electronic component and the second electronic component include authentication circuitry configured to inhibit entering the second mode of operation in the absence of an authentication signal passing between the first and the second electronic components.

23. The apparatus of claim 22, further comprising:
the second electronic component comprising second radio interface circuitry configured to generate the radio frequency signal;
wherein the second electronic component is switchable such that in the first mode of operation, the second radio interface circuitry is configured to transmit the radio frequency signal via a second antenna, and in a second mode of operation, the second radio interface circuitry is configured to transmit the radio frequency signal to the first electronic component via the constrained radio frequency signal path coupling the first electronic component and the second electronic component.

24. An apparatus comprising:
a first electronic component comprising first interface circuitry configured to generate an electromagnetic signal;
wherein the first electronic component is switchable such that in a first mode of operation, the first interface circuitry is configured to transmit the generated electromagnetic signal via a first antenna, and in a second mode of operation, the first interface circuitry is configured to transmit the electromagnetic signal to a second electronic component via a constrained signal path coupling the first electronic component and the second electronic component, wherein the first electronic component and the second electronic component include authentication circuitry configured to inhibit entering the second mode of operation in the absence of an authentication signal passing between the first and the second electronic components.

25. The apparatus of claim 24, wherein the generated electromagnetic signal includes one of an optical signal and a radio frequency signal.

\* \* \* \* \*